(12) United States Patent
Akao et al.

(10) Patent No.: US 9,141,265 B2
(45) Date of Patent: Sep. 22, 2015

(54) INFORMATION PROCESSING APPARATUS, APPLICATION PROVISION SYSTEM, APPLICATION PROVISION SERVER, AND INFORMATION PROCESSING METHOD

(75) Inventors: Ryota Akao, Kanagawa (JP); Tatsuya Suzuki, Tokyo (JP); Hiroshi Aruga, Kanagawa (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 164 days.

(21) Appl. No.: 13/596,293

(22) Filed: Aug. 28, 2012

(65) Prior Publication Data

US 2013/0069869 A1    Mar. 21, 2013

(30) Foreign Application Priority Data

Sep. 20, 2011    (JP) .................................. 2011-205313

(51) Int. Cl.
- G09G 5/08 (2006.01)
- G06F 3/0484 (2013.01)
- A63F 13/40 (2014.01)
- A63F 13/30 (2014.01)

(52) U.S. Cl.
CPC .............. *G06F 3/0484* (2013.01); *A63F 13/10* (2013.01); *A63F 13/12* (2013.01); *A63F 2300/209* (2013.01); *A63F 2300/308* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2006/0077185 A1* | 4/2006 | Mashimo | 345/173 |
| 2008/0204419 A1* | 8/2008 | Grothe | 345/173 |
| 2008/0291173 A1* | 11/2008 | Suzuki | 345/173 |
| 2010/0164888 A1* | 7/2010 | Okumura et al. | 345/173 |
| 2011/0006983 A1* | 1/2011 | Grothe | 345/157 |
| 2011/0210922 A1* | 9/2011 | Griffin | 345/173 |
| 2011/0225538 A1* | 9/2011 | Oyagi et al. | 715/781 |
| 2011/0300934 A1* | 12/2011 | Toy et al. | 463/31 |
| 2012/0007805 A1* | 1/2012 | Kim | 345/159 |
| 2012/0044164 A1* | 2/2012 | Kim et al. | 345/173 |
| 2012/0154377 A1* | 6/2012 | Sato et al. | 345/419 |
| 2013/0005469 A1* | 1/2013 | Selim | 463/37 |

FOREIGN PATENT DOCUMENTS

| | | |
|---|---|---|
| JP | 2006-102327 | 4/2006 |
| KR | 10-2011-0053014 | 5/2011 |

OTHER PUBLICATIONS

Notification of Reason(s) for Refusal dated Sep. 10, 2013, from corresponding Japanese Application No. 2011-205313.
Korean Notice of Preliminary Rejection dated Sep. 30, 2013, from corresponding Korean Application No. 10-2012-0103262.

* cited by examiner

*Primary Examiner* — Seokyun Moon
*Assistant Examiner* — Josemarie G Acha, III
(74) *Attorney, Agent, or Firm* — Katten Muchin Rosenman LLP

(57) ABSTRACT

In an information processing apparatus, a motion vector acquisition unit acquires the movement of a cursor of a pointing device as a motion vector. A display unit displays an execution screen for an application. The display unit displays an operation area for operating an operation target in the application in an area of a display screen different from an area for displaying the execution screen. A conversion unit obtains the moving direction and the amount of displacement of the display position of the operation target based on the motion vector, acquired by the motion vector acquisition unit, of the cursor of the pointing device in the operation area.

10 Claims, 7 Drawing Sheets

INFORMATION PROCESSING APPARATUS, APPLICATION PROVISION SYSTEM, APPLICATION PROVISION SERVER, AND INFORMATION PROCESSING METHOD

BACKGROUND OF THE INVENTION

1. Field of the Invention

The present invention relates to an information processing apparatus, an application provision system, an application provision server, an application provision method used thereby, and an information processing method.

2. Description of the Related Art

Outstanding progress is seen in computer technologies in recent years. For example, costly applications that require high computational costs such as game applications used to require specialized hardware for execution in the past. However, in recent years, a so-called game emulator that allows software to emulate hardware thereof so as to execute a game application is put into a practical use.

Games developed being designed to be executed on specialized hardware are often designed to be operated using specialized game controllers. On the other hand, in the case where a game is executed using a game emulator that operates on a versatile PC (Personal Computer) or a server, it cannot be guaranteed that a game controller is prepared as an input device. Therefore, there is a need for techniques that allow various games to be operated using a versatile input device such as a pointing device represented by a mouse.

SUMMARY OF THE INVENTION

In this background, a purpose of the present invention is to provide a technology for allowing an application, which is designed to be operated by a specialized controller, to be operated using a versatile input device.

One embodiment of the present invention relates to an information processing apparatus. The apparatus comprises: a motion vector acquisition unit configured to acquire the movement of a cursor of a pointing device as a motion vector; a display unit for displaying a game execution screen for an application, configured to display in an area of a display screen of the display unit an operation area for operating an operation target in the application, the area of the display screen being different from an area for displaying the execution screen; and a conversion unit configured to map, to the movement of the display position of the operation target, the motion vector of the cursor of the pointing device acquired by the motion vector acquisition unit in the operation area.

Another embodiment of the present invention relates to an application provision system comprising an information processing apparatus and a server that provides an application to the information processing apparatus via a network. The system comprises: a recording unit configured to store a program for realizing the application; an application provision unit configured to provide the application; a display unit configured to display an execution screen for the application; a motion vector acquisition unit configured to acquire, as a motion vector, the movement of a cursor of a pointing device in the information processing apparatus; and a conversion unit configured to map the motion vector to the movement of the current position of an operation target in the application. The display unit displays an area for displaying the execution screen for the application and an operation area for acquiring the motion vector different from the area for displaying the execution screen on a display screen. The information processing apparatus includes the display unit and the motion vector acquisition unit, and the server includes the recording unit. The application provision unit and the conversion unit are included in at least one of the information processing apparatus or the server.

Yet another embodiment of the present invention relates to an application provision method performed in a system comprising an information processing apparatus and a server for providing an application to the information processing apparatus via a network. The method comprises: acquiring a program from a recording unit storing the program for realizing the application; providing the application; acquiring, as a motion vector, the movement of a cursor of a pointing device in the information processing apparatus; displaying an area for displaying an execution screen for the application and an operation area for acquiring the motion vector different from the area for displaying the execution screen on a display screen; and mapping the motion vector to the movement of the current position of an operation target in the application. The server performs the acquisition of the program, and the information processing apparatus performs the displaying of the area and the acquisition of the motion vector. The providing of the application and the mapping of the motion vector are performed by at least one of the information processing apparatus and the server.

Yet another embodiment of the present invention relates to a server for providing an application to an information processing apparatus via a network in an application provision system comprising a server and an information processing apparatus. The server comprises at least a recording unit configured to store a program for realizing the application. The application provision system comprises: an application provision unit configured to provide the application; a display unit configured to display an execution screen for the application on the information processing apparatus and to display an area for displaying the execution screen for the application and an operation area for acquiring the motion vector different from the area for displaying the execution screen on a display screen; a motion vector acquisition unit configured to acquire, as a motion vector, the movement of a cursor of a pointing device in the information processing apparatus; and a conversion unit configured to map the motion vector to the movement of the current position of an operation target in the application.

Still another embodiment of the present invention relates to an information processing method. The method allows a processor to map the movement of a cursor of a pointing device, wherein the movement of the cursor is mapped to the movement of the current position of an operation target in a game, wherein the movement of the cursor is in an operation area provided in an area different from an area for displaying an execution screen, and wherein the movement of the cursor is mapped on a display screen for displaying the execution screen for the game.

Optional combinations of the aforementioned constituting elements, and implementations of the invention in the form of methods, apparatuses, systems, computer programs, data structures, and recording media may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

The overview of the embodiment is now given. An information processing apparatus 100 according to the embodiment maps, to the movement of an operation target in an application, the movement of a cursor of a pointing device in an operation area different from an area for displaying an execution screen for the application.

An explanation is given in the following regarding a case where a game application developed being designed to be executed on specialized hardware is executed using a game emulator in the information processing apparatus 100. It will be obvious to those skilled in the art that a means for executing a game application is not limited to using a game emulator and that, for example, a case where a processor of a PC (Personal Computer) directly executes a game application without involving a game emulator is also included in the embodiment. For the sake of ease of explanation, an explanation is given using as an example a case where a game application is executed. An application to be executed is not limited to games. For example, a case where an application such as image editing software, etc., that belongs to the genre other than games is also included in the embodiment.

Figure 1:
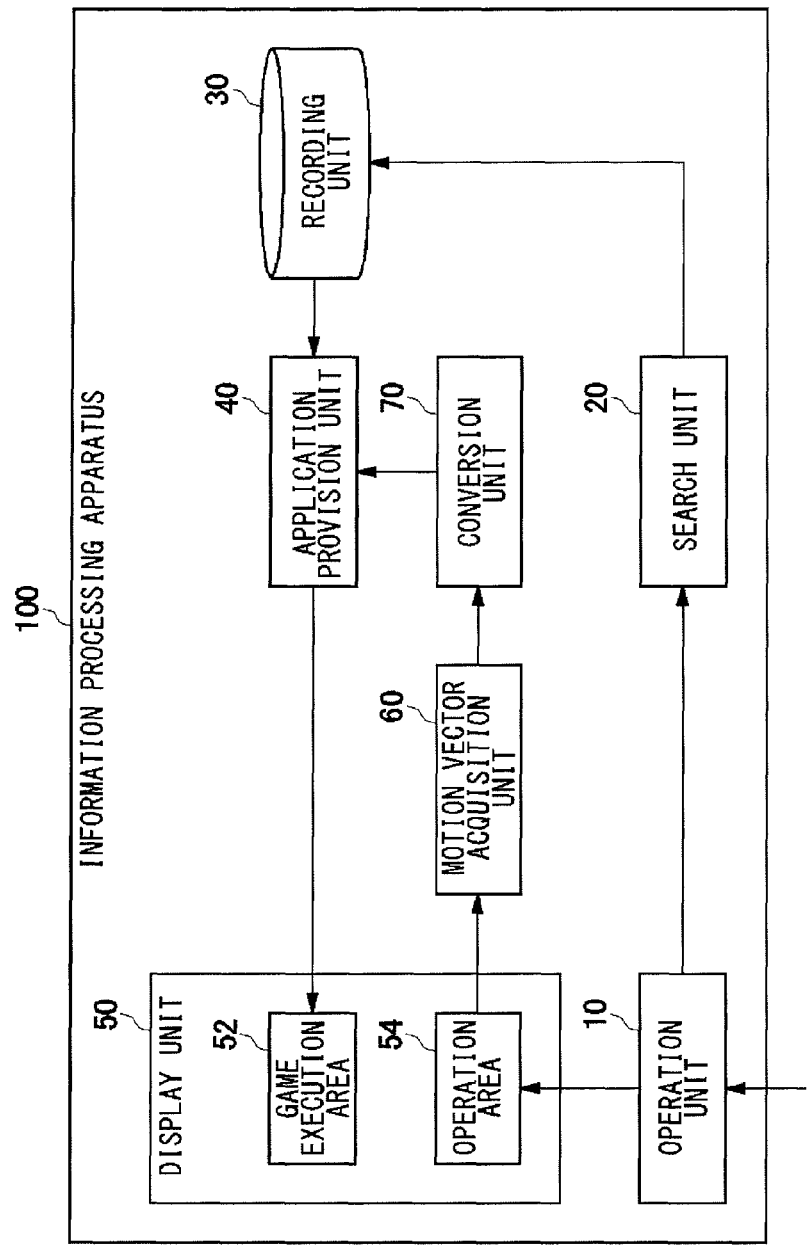
FIG. 1 is a diagram schematically illustrating the functional configuration of an information processing apparatus according to an embodiment.

FIG. 1 is a diagram schematically illustrating the functional configuration of the information processing apparatus 100 according to the embodiment. The information processing apparatus 100 comprises an operation unit 10, a search unit 20, a recording unit 30, an application provision unit 40, a display unit 50, a motion vector acquisition unit 60, and a conversion unit 70.

FIG. 1 illustrates a functional configuration for providing the information processing apparatus 100 according to the embodiment. Other configurations are omitted. In FIG. 1, the elements shown in functional blocks that indicate a variety of processes are implemented in hardware by any CPU (Central Processing Unit), main memory, or other LSI's (Large Scale Integrations), and in software by a program loaded in main memory, etc. Therefore, it will be obvious to those skilled in the art that the functional blocks may be implemented in a variety of manners by a combination of hardware and software. The same applies to FIGS. 4 and 6 that are described later.

The operation unit 10 is one of user interfaces of the information processing apparatus 100. More specifically, the operation unit 10 is a pointing device represented by a mouse, a touchpad, etc. By operating the pointing device, the user can freely move a cursor displayed on a display screen of the display unit 50.

The search unit 20 searches for a game application desired by a user using the information processing apparatus 100 from a plurality of game applications stored in the recording unit 30. Although not shown in the figure, the search unit 20 provides a search interface for searching for an application. Through the search interface displayed on the display unit 50, the user can search for an application using the title of a game, the name of a distributor, the date of release, a genre, etc., as search keys.

The recording unit 30 stores a program for realizing a game application. The application provision unit 40 acquires a program for realizing the game application specified by the user via the search unit 20 from the recording unit 30.

The display unit 50 is a display device such as, for example, an LCD monitor, an organic EL (ElectroLuminescence) monitor, etc. The display unit 50 displays a game execution area 52, which is an execution screen for a game application, and an operation area 54 for operating an operation target in the game application. The display unit 50 displays the game execution area 52 and the operation area 54 in different areas of the display screen of the display unit 50.

The motion vector acquisition unit 60 acquires the movement of the cursor of the pointing device, which is the operation unit 10, as a motion vector. The details of the motion vector acquisition unit 60 will be described later.

The conversion unit 70 maps, to the movement of the display position of the operation target in the game application, a motion vector of the cursor of the pointing device in the operation area 54, the motion vector being acquired by the motion vector acquisition unit 60. Games that are developed being designed to be executed on specialized hardware are often designed to be operated using specialized game controllers. The conversion unit 70 converts the movement of the cursor of the pointing device into an input signal from a game controller, on which a game is premised, and inputs the signal to the application provision unit 40. The application provision unit 40 moves the operation target based on the input signal, and the display unit 50 incorporates a result thereof in the display of the game execution area 52.

For example, there are games that require the user to enter an operation of hitting an operation button repeatedly in a continuous manner just like an attacking operation in a shooting game. In such a case, even when the user does not hit the operation button repeatedly, the conversion unit 70 may automatically generate an input signal that can be obtained when the operation button is repeatedly hit and inputs the input signal to the application provision unit 40. This is advantageous in that, when using an input device whose button is not expected to be repeatedly hit in a continuous manner, an operational burden imposed on the user is reduced while protecting the input device.

Figure 2:
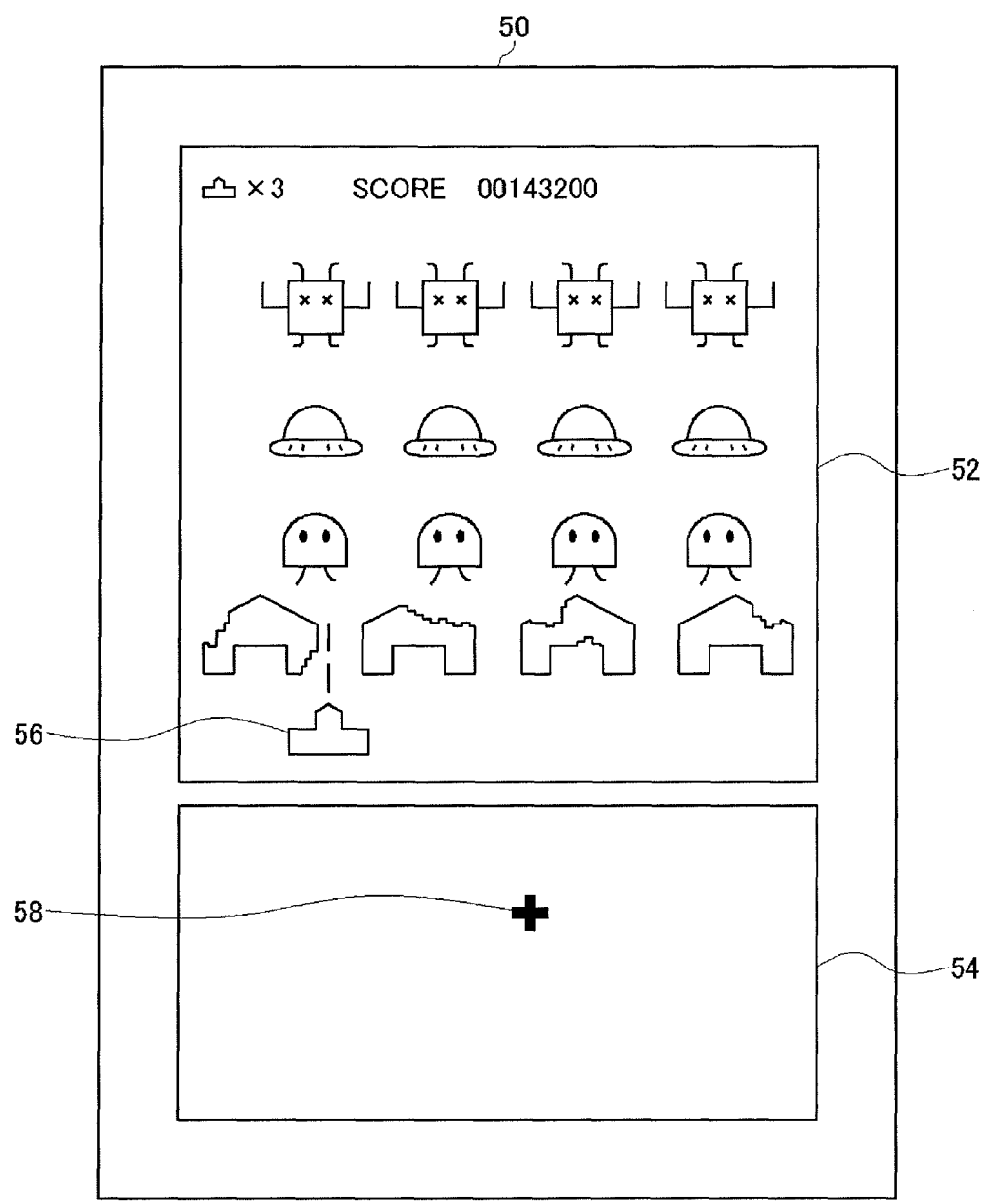
FIG. 2 is a diagram illustrating an example of a screen displayed by a display unit according to the embodiment.

FIG. 2 is a diagram illustrating an example of a screen displayed by the display unit 50 according to the embodiment. In the example shown in FIG. 2, the user is required to appropriately move an operation target 56 displayed in the game execution area 52 from side to side depending on the progress of the game. A cursor 58 of the pointing device is displayed in the operation area 54. For example, when the user moves the cursor 58 to the right with respect to the position at which the cursor 58 is currently displayed, the conversion unit 70 generates a signal obtained when a right button (not shown) of a directional key of a game controller is pressed and then inputs the signal to the application provision unit 40. As a result, the operation target 56 in the game execution area 52 is moved to the right and displayed. Similarly, when the user moves the cursor 58 to the left with respect to the current position, the operation target 56 is moved to the left accordingly and displayed.

Figure 3A:
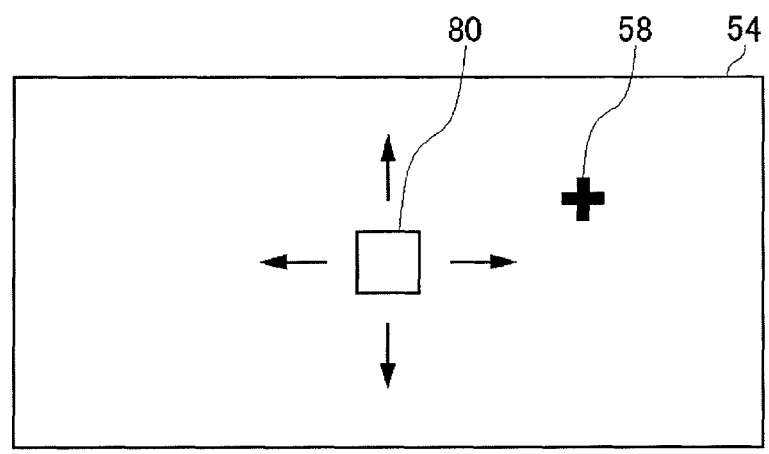
FIG. 3A is a diagram illustrating another example of an operation area according to the embodiment.
Figure 3B:
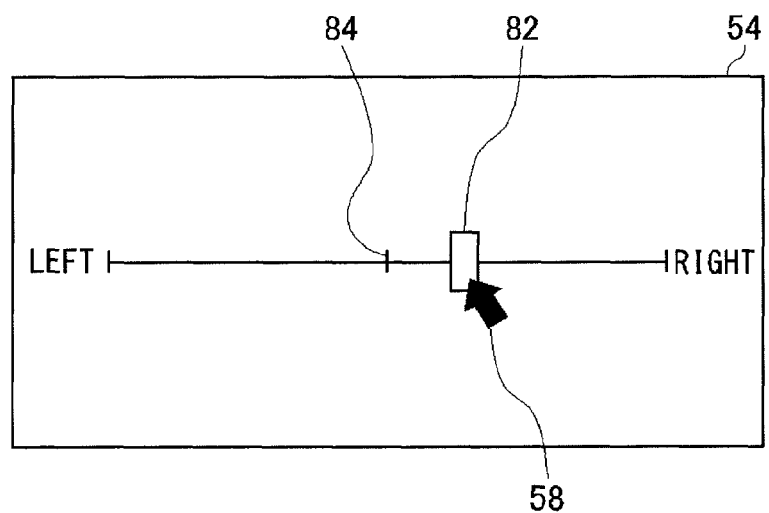
FIG. 3B is a diagram illustrating yet another example of the operation area according to the embodiment.

FIGS. 3A and 3B are diagrams each illustrating another example of the operation area 54 according to the embodiment. In an example shown in FIG. 3A, an originating position 80 for determining the moving direction of the operation target 56 is displayed in the operation area 54. As will hereinafter be described in detail, the conversion unit 70 generates an input signal from the game controller based on a positional relationship between the originating position 80 and the cursor 58. As a result, the positional relationship between the originating position 80 and the cursor 58 is mapped to the movement of the operation target 56 and displayed in the game execution area 52.

In an example shown in FIG. 3B, a slider bar 82 is displayed in the operation area 54. When the user drags the slider bar 82 using the cursor 58, the operation target 56 moves in accordance with a positional relationship between the center 84 of the slider bar and the cursor 58. The slider bar 82 moves only one-dimensionally in the horizontal direction. Thus, for example, in the game shown in FIG. 2, the slider bar 82 is suitable for operating the operation target 56 that moves one-dimensionally.

Figure 4:
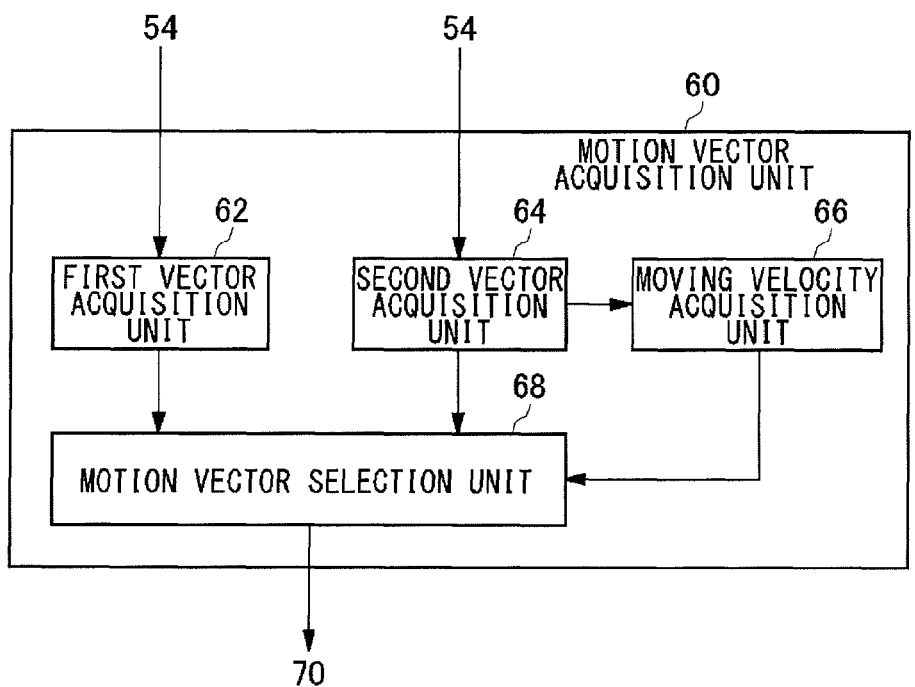
FIG. 4 is a diagram schematically illustrating the internal configuration of a motion vector acquisition unit according to the embodiment.

FIG. 4 is a diagram schematically illustrating the internal configuration of the motion vector acquisition unit 60 according to the embodiment. The motion vector acquisition unit 60 comprises a first vector acquisition unit 62, a second vector acquisition unit 64, a moving velocity acquisition unit 66, and a motion vector selection unit 68.

The first vector acquisition unit 62 obtains a vector starting at the originating position 80 illustrated in FIG. 3A and ending at the position of the cursor 58 of the pointing device. More specifically, the first vector acquisition unit 62 acquires the positional coordinates of the cursor 58 at predetermined sampling intervals determined to acquire a vector so as to obtain a vector originating at the originating position 80. Therefore, the vector obtained by the first vector acquisition unit 62 is a motion vector of the cursor 58 obtained when the starting position of the vector is fixed. The sampling interval needs to be determined through experiments for each game application in consideration of operability and computational costs required for the operation target 56. For example, the sampling interval is 0.1 second. The motion vector obtained by the first vector acquisition unit 62 is updated at the sampling intervals.

The second vector acquisition unit 64 samples the position of the cursor 58 of the pointing device at the sampling intervals and then obtains a vector ending at the latest sampled position of the cursor 58 and starting at the position of the cursor 58 sampled at one previous interval. Therefore, the vector obtained by the second vector acquisition unit 64 is an instantaneous motion vector of the cursor 58. The motion vector obtained by the second vector acquisition unit 64 is also updated at the sampling intervals.

The moving velocity acquisition unit 66 obtains the moving velocity of the cursor 58 based on the length of a motion vector obtained by the second vector acquisition unit 64 and on the sampling interval. For example, if the length of the motion vector obtained by the second vector acquisition unit 64 is 10 pixels in units of pixels of the display unit 50, and if the sampling interval is 0.1 second, the moving velocity of the cursor 58 is obtained as follows: 10 pixels/0.1 second=100 pixel/second When a type of operation area 54 that displays the originating position 80 illustrated in FIG. 3A is used, the motion vector selection unit 68 selects either one of the vector obtained by the first vector acquisition unit 62 or the vector obtained by the second vector acquisition unit and sets the selected vector as a motion vector. More specifically, the motion vector selection unit 68 acquires the moving velocity of the cursor 58 from the moving velocity acquisition unit 66. Next, the motion vector selection unit 68 compares the moving velocity of the cursor 58 with a predetermined vector selection reference velocity determined as a reference for selecting a motion vector in terms of a magnitude relationship therebetween.

The vector selection reference velocity is a velocity used as a reference for determining whether the user is moving the cursor 58 quickly or slowly. If the moving velocity of the cursor 58 is less than or equal to the vector selection reference velocity, the motion vector selection unit 68 determines that the user is slowly moving the cursor 58. On the contrary, if the moving velocity exceeds the vector selection reference velocity, the motion vector selection unit 68 determines that the user is quickly moving the cursor 58. The vector selection reference velocity needs to be determined through experiments for each game application to be operated.

In the type of operation area 54 that displays the originating position 80 illustrated in FIG. 3A, the center position used when the operation target 56 is operated is fixed, offering an advantage that the user can easily recognize a direction of operating the operation target 56. Meanwhile, for example, in a case of playing a fast-moving game such as a shooting game, it is also possible that the user tries to operate the operation target 56 based on quick thinking. In such a case, the user tends to move the cursor 58 in a direction in which the user desires the operation target 56 to move without taking into consideration the positional relationship between the originating position 80 and the cursor 58. The moving velocity of the cursor 58 tends to become large. Therefore, the moving velocity of the cursor 58 becomes an indicator for determining whether or not the user has moved the cursor 58 based on quick thinking.

When the moving velocity of the cursor 58 is less than or equal to the vector selection reference velocity, the motion vector selection unit 68 selects the vector obtained by the first vector acquisition unit 62 as a motion vector. This is because it can be considered that the user is operating the operation target 56 while being aware of the positional relationship between the originating position 80 and the cursor 58 when the movement of the cursor 58 is slow.

On the other hand, if the moving velocity of the cursor 58 exceeds the vector selection reference velocity, the motion vector selection unit 68 selects the vector obtained by the second vector acquisition unit 64 as a motion vector. This is because it can be considered that the user has moved the cursor 58 in a direction in which the user desires the operation target 56 to move based on quick thinking when the movement of the cursor 58 is quick. As described, by changing a method for acquiring a motion vector in accordance with the size of the moving velocity of the cursor 58, the user's intention of trying to move the operation target 56 can be properly incorporated.

Figure 5:
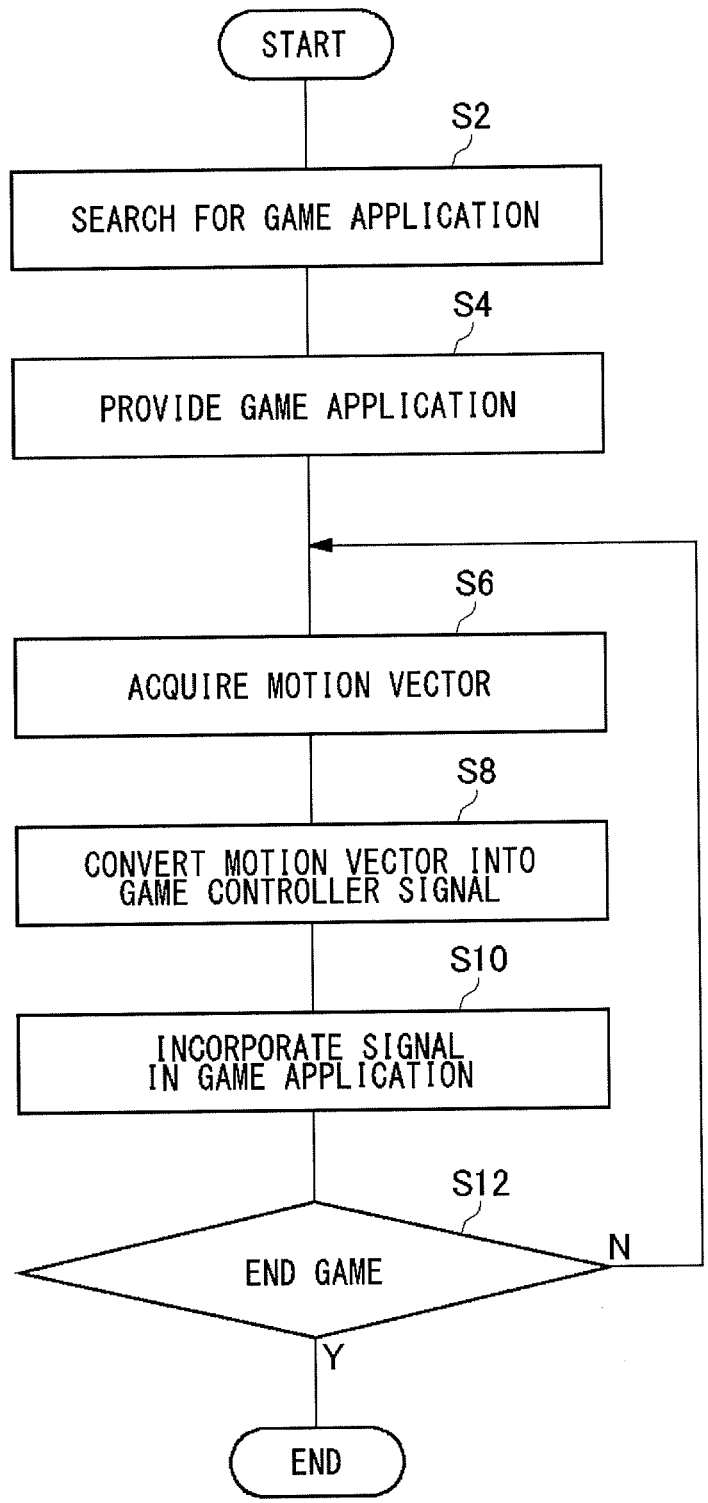
FIG. 5 is a flow chart explaining a process flow of the information processing apparatus according to the embodiment.

FIG. 5 is a flow chart explaining a process flow of the information processing apparatus 100 according to the embodiment. Processes in the flowchart are started, for example, when the user turns on the power of the information processing apparatus 100.

The search unit 20 searches for a game application specified by the user via the operation unit 10 in the recording unit 30 (S2). The application provision unit 40 acquires from the recording unit 30 a program for realizing the game application searched for by the search unit 20 so as to provide the game application to the user (S4).

The motion vector acquisition unit 60 detects the movement of the cursor 58 of the pointing device in the operation area 54 and then acquires the motion vector thereof (S6). The conversion unit 70 converts the motion vector acquired by the motion vector acquisition unit 60 into an input signal from the game controller (S8).

The application provision unit 40 incorporates the input signal acquired from the conversion unit 70 in the movement of the operation target 56 in the game application being provided (S10). If the game is not ended (N in S12), the information processing apparatus 100 maps the operation of the pointing device made by the user to the movement of the operation target 56 of the game application by repeating the processes in the above-stated steps S6 through S10.

When the game is ended (Y in S12), the processes in this flowchart are ended.

The operation of the above configuration is shown in the following. When the user is provided with the game application in the information processing apparatus 100, the motion vector acquisition unit 60 detects the movement of the cursor 58 of the pointing device in the operation area 54 as a motion vector. The detected motion vector is converted into an input signal from the game controller input signal, on which a game is premised, by the conversion unit 70. The converted input signal is input to the application provision unit 40 for executing a program for realizing the game application, and the movement of the cursor 58 is mapped to the movement of the operation target 56 in the game application as a result.

By providing both the game execution area 52 for displaying an execution screen for the game application and the operation area 54 for operating the operation target 56 in the game application as different areas, the cursor 58 of the pointing device can be prevented from hiding a part of the game execution area 52.

As described above, a technology for allowing for operation of a game using a versatile input device can be provided according to the embodiment.

Described above is an explanation of the present invention based on the embodiments. The embodiment is intended to be illustrative only, and it will be obvious to those skilled in the art that various modifications to constituting elements and processes could be developed and that such modifications are also within the scope of the present invention.

Exemplary Variation 1

In the embodiment explained above, an explanation is given on the premise that the information processing apparatus 100 is a single apparatus independent from other apparatuses. However, the embodiment is not limited to a case where the information processing apparatus 100 is independent from other apparatuses. For example, a client-server model system may be employed where the information processing apparatus 100 is connected to an application provision server via a network such that an application is provided from the server. An explanation is given of an exemplary variation in such a case in the following. Explanations that are similar to those described in the above embodiment are appropriately omitted or simplified.

Figure 6:
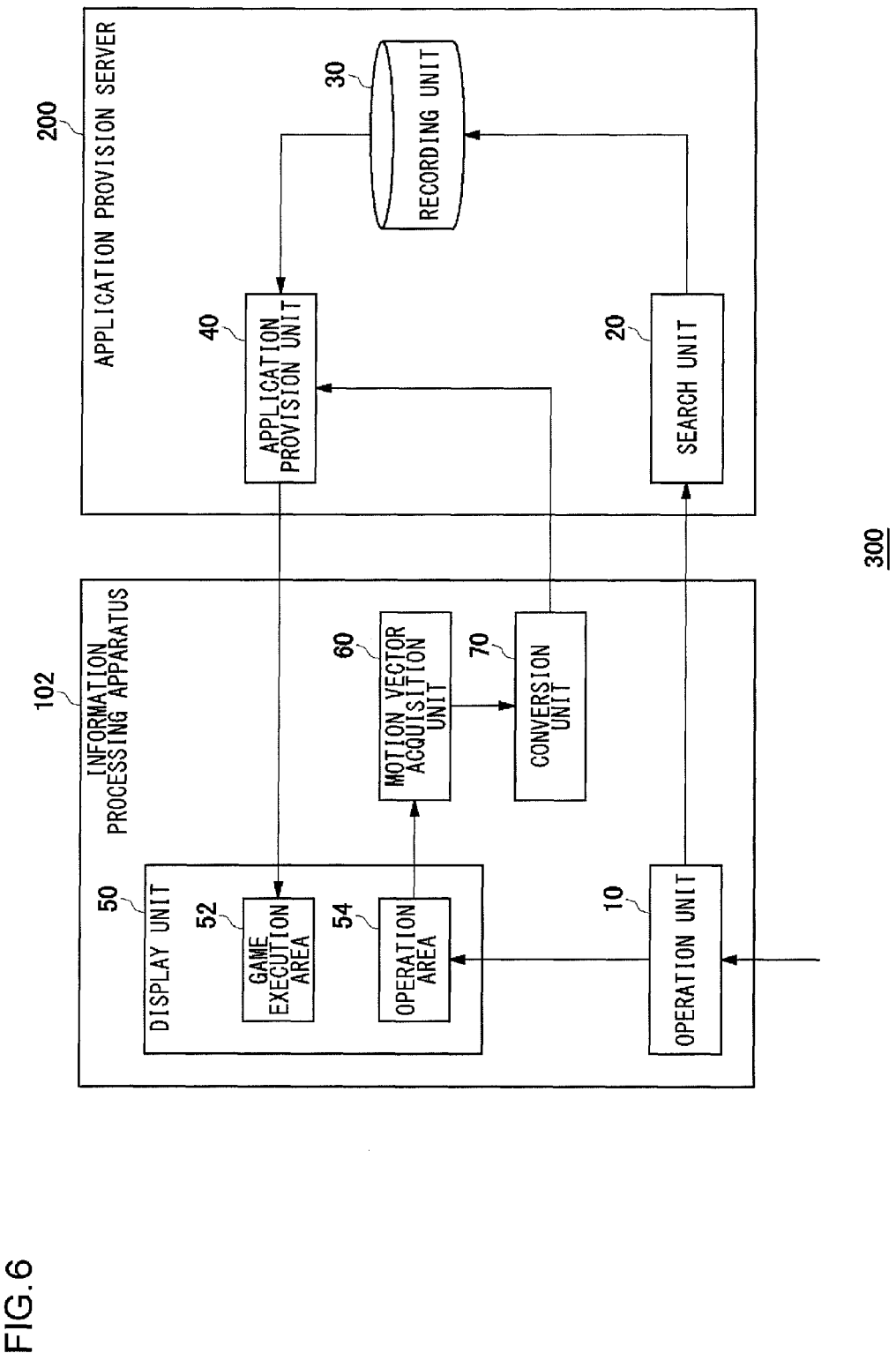
FIG. 6 is a diagram schematically illustrating the functional configuration of an application provision system according to the embodiment.

FIG. 6 is a diagram schematically illustrating the functional configuration of an application provision system 300 according to the embodiment. The application provision system 300 comprises an information processing apparatus 102 and an application provision server 200 that connects to the information processing apparatus 102 via a network in a state where communication can be performed.

The information processing apparatus 102 is a client terminal used by the user using the application provision system 300. The information processing apparatus 102 comprises an operation unit 10, a display unit 50, a motion vector acquisition unit 60, and a conversion unit 70. The operation of each unit in the information processing apparatus 102 is the same as that of a corresponding unit in the above-stated information processing apparatus 100. When the user specifies a desired application via the operation unit 10, the according information is transmitted to a search unit 20 of the application provision server 200, which will be described later, via a network. An execution screen displayed in the game execution area 52 is transmitted from an application provision unit 40 of the application provision server 200 via a network.

The application provision server 200 comprises a search unit 20, a recording unit 30, and an application provision unit 40. The operation of each unit in the application provision server 200 is the same as that of a corresponding unit in the above-stated information processing apparatus 100.

As shown in FIG. 6, when the recording unit 30 that stores a program for realizing a game application exists in the application provision server 200, the user using the information processing apparatus 102 can be provided with the game application even when the user does not possess the program.

As described previously, outstanding progress is seen in computer technologies in recent years. For example, costly applications that require high computational costs such as game applications used to require specialized hardware for execution in the past. However, in recent years, even a so-called game emulator that allows software to emulate hardware thereof so as to execute a game application is put into a practical use. Executing an emulator on the application provision server 200 such that a game operates on the emulator allows the user to be provided with a game application even when the information processing apparatus 102 being used by the user does not have an emulator.

In particular, since a huge number of game applications have been developed in the past, it is appropriate to manage programs thereof using specialized servers. For the user, this is advantageous in that a desired game application can be provided from many choices. For a facility manager of the application provision server 200, this is advantageous in that new business can be created by reusing game applications developed in the past.

The above-stated operation unit 10 and display unit 50 are used by the user. Therefore, it is meaningless if these units are not included in the information processing apparatus 102. The motion vector acquisition unit 60 is closely related to the operation area 54 in the display unit 50. Thus, the motion vector acquisition unit 60 is preferably included in the information processing apparatus 102. It is appropriate that the recording unit 30 is included in the application provision server 200 serving as a specialized server to manage a vast number of programs.

Meanwhile, whether the conversion unit 70, the search unit 20, and the application provision unit 40 are included in the information processing apparatus 102 or in the application provision server 200 does not affect the operation thereof. FIG. 6 shows an example of the arrangement of the conversion unit 70, the search unit 20, and the application provision unit 40 in the application provision system 300. The arrangement is not necessarily limited to the arrangement shown in FIG. 6. For example, the conversion unit 70, the search unit 20, and the application provision unit 40 may be all included in the application provision server 200. Alternatively, the application provision unit 40 may be included in both the information processing apparatus 102 and the application provision server 200.

The application provision unit 40 realizes the provision of an application by executing a program stored in the recording unit 30. Therefore, at least one of a processor (not shown) of the information processing apparatus 102 or a processor (not shown) of the application provision server 200 needs to execute the program.

As described, there is flexibility in the configuration of the units and in a subject for performing a process in the application provision system 300. Descriptions of all case analyses will include duplication and will thus become complicated, making the point of the present invention unclear. Thus, such descriptions are omitted. It will be obvious to those skilled in the art that any of these cases are also included in the embodiment.

Exemplary Variation 2

Figure 7A:
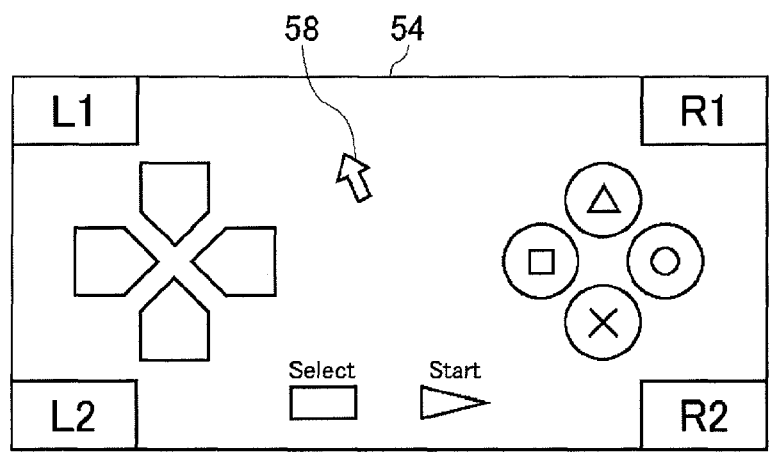
FIG. 7A is a diagram illustrating yet another example of the operation area according to the embodiment.
Figure 7B:
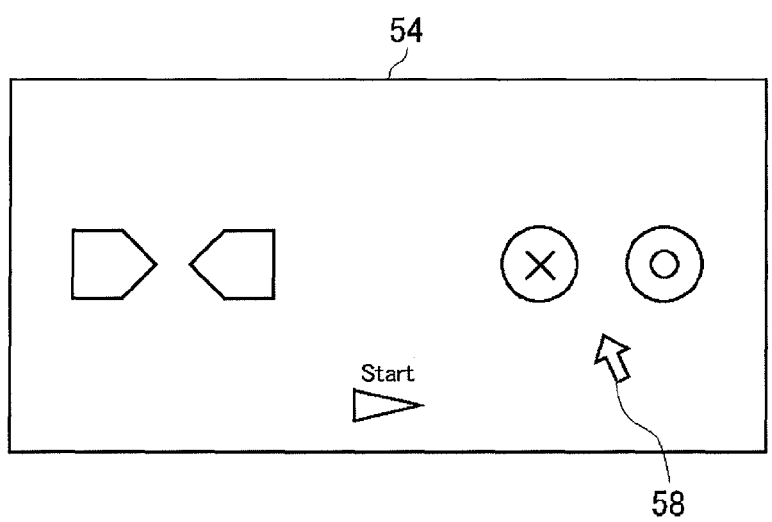
FIG. 7B is a diagram illustrating yet another example of the operation area according to the embodiment.

FIGS. 7A and 7B are diagrams each illustrating yet another example of the operation area 54 according to the embodiment. FIG. 7A illustrates an example of the operation area 54 displaying all operation buttons of a commonly-used game controller. For example, when the user moves the cursor 58 by operating a mouse so as to click an icon that corresponds to an operation button, the conversion unit 70 generates an input signal that can be generated when the operation button is pressed.

An application provided by the application provision unit 40 may be provided, instead of in the entire application, in small units that are obtained by dividing the application. For example, if there is a stage that can serve as a unit in a game, the stage is used as a unit. Alternatively, if there is a so-called boss battle in a game, only the boss battle is used as a unit.

With the development of microprocessors and portable information terminals in recent years, environments that allow users to enjoy games easily without worrying about the time and place have become realized, and the number of users who enjoy games during some spare time has been increasing. With this, demand for a utilization form of games has been increasing where the users enjoy the games in small units for only a short period of time. By providing applications that end in a short period of time in small units, user's demand for enjoying games freely using some spare time can be satisfied using services provided by the application provision system 300.

As described, when the application provision unit 40 provides a game application in small units, only some operation buttons of the game controller may be necessary to play those units. FIG. 7B illustrates an example of the operation area 54 displaying only some operation buttons of a commonly-used game controller. As shown in FIG. 7B, the configuration of the operation area 54 can be simplified so as to improve the operability by providing in the operation area 54 a minimum number of operation buttons necessary to operate the operation target 56 of the game application.

The type of operation buttons necessary to operate the operation target 56 of the game application varies according to game applications and units in which the game applications are provided. The recording unit 30 may link the type of operation buttons, which are necessary for each unit in which the game application is provided, with the unit and store the type linked with the unit. The display unit 50 acquires the type of necessary operation buttons from the recording unit 30 via the application provision unit 40 and displays only those buttons in the operation area 54. This allows the proper operation area 54 to be provided to the user according to a unit in which the game application is provided, further improving the operability of the operation area 54.

Exemplary Variation 3

In the above explanation, an explanation is given regarding a case where the motion vector selection unit 68 selects either one of the vector obtained by the first vector acquisition unit 62 or the vector obtained by the second vector acquisition unit 64 and sets the selected vector as a motion vector. However, a motion vector is not limited to be obtained based on the choice between the two. For example, when the moving velocity of the cursor 58 exceeds the vector selection reference velocity, the motion vector selection unit 68 may generate a new vector by synthesizing the vector obtained by the first vector acquisition unit 62 or the vector obtained by the second vector acquisition unit 64 and then set the new vector as a motion vector. Although not shown in the figure, this can be achieved by providing a vector synthesis unit in the motion vector selection unit 68. Alternatively, a vector synthesis unit may be provided in parallel with the motion vector selection unit 68. With this, user's quick thinking can be incorporated in the operation of the operation target 56 while following a principle of setting the originating position 80 as the origin of a motion vector. When the moving velocity of the cursor 58 is less than or equal to the vector selection reference velocity, the motion vector selection unit 68 needs to set the vector obtained by the first vector acquisition unit 62 as a motion vector.

What is claimed is:

1. An information processing apparatus comprising:
a motion vector acquisition unit configured to acquire the movement of a cursor of a pointing device as a motion vector;
a display unit for displaying a game execution screen for an application, configured to display in an area of a single display screen of the display unit an operation area for operating an operation target in the application, the area of the single display screen being different from an area for displaying the execution screen,
wherein the operation area and the execution screen are both included on the single display screen; and
a conversion unit configured to map, to the movement of the display position of the operation target, the motion vector of the cursor of the pointing device acquired by the motion vector acquisition unit in the operation area,
wherein the display unit displays a starting position that serves as the origin for calculating the motion vector in the operation area, and
wherein the motion vector acquisition unit acquires a vector starting at the starting position and ending at the position of the cursor of the pointing device,
wherein the motion vector acquisition unit includes:
a first vector acquisition unit for obtaining a vector starting at the starting position and ending at the position of the cursor of the pointing device;
a second vector acquisition unit for sampling the position of the cursor of the pointing device at predetermined sampling intervals and then obtaining a vector ending at the latest sampled position of the cursor and starting at the position of the cursor sampled at one previous interval;

a moving velocity acquisition unit for obtaining the moving velocity of the cursor based on the length of a motion vector obtained by the second vector acquisition unit and based on the sampling interval; and a motion vector selection unit for selecting the vector obtained by the first vector acquisition unit as the motion vector when the moving velocity obtained by the moving velocity acquisition unit is less than or equal to a predetermined vector selection reference velocity, and for selecting the vector obtained by the second vector acquisition unit as the motion vector when the moving velocity obtained by the moving velocity acquisition unit exceeds the vector selection reference velocity.

2. An application provision system comprising an information processing apparatus and a server for providing an application to the information processing apparatus via a network, further comprising:

a recording unit configured to store a program for realizing the application;

an application provision unit configured to provide the application;

a display unit configured to display an execution screen for the application; and a motion vector acquisition unit configured to acquire, as a motion vector, the movement of a cursor of a pointing device in the information processing apparatus;

a conversion unit configured to map the motion vector to the movement of the current position of an operation target in the application, wherein the display unit displays an area for displaying the execution screen for the application and an displays an operation area for acquiring the motion vector different from the area for displaying the execution screen on a single display screen, wherein the information processing apparatus includes the display unit and the motion vector acquisition unit, wherein the server includes the recording unit, wherein the application provision unit and the conversion unit are included in at least one of the information processing apparatus and the server, wherein the display unit displays a starting position that serves as the origin for calculating the motion vector in the operation area, and wherein the motion vector acquisition unit acquires a vector starting at the starting position and ending at the position of the cursor of the pointing device, wherein the motion vector acquisition unit includes:

a first vector acquisition unit for obtaining a vector starting at the starting position and ending at the position of the cursor of the pointing device;

a second vector acquisition unit for sampling the position of the cursor of the pointing device at predetermined sampling intervals and then obtaining a vector ending at the latest sampled position of the cursor and starting at the position of the cursor sampled at one previous interval;

moving velocity acquisition unit for Obtaining the moving velocity of the cursor based on the length of a motion vector obtained by the second vector acquisition unit and based on the sampling interva; and a motion vector selection unit for selecting the vector Obtained by the first vector acquisition unit as the motion vector when the moving velocity obtained by the moving velocity acquisition unit is less than or equal to a predetermined vector selection reference velocity, and for selecting the vector obtained by the second vector acquisition unit as the motion vector when the moving velocity obtained by the moving velocity acquisition unit exceeds the vector selection reference velocity.

3. The application provision system according to claim 2, wherein the application provision unit realizes the provision of an application by executing a program stored in the recording unit, and wherein at least one of a processor of the information processing apparatus or a processor of the server executes the program.

4. An application provision method performed in a system comprising an information processing apparatus and a server for providing an application to the information processing apparatus via a network, comprising:

acquiring a program from a recording unit storing the program for realizing the application;

providing the application;

acquiring, as a motion vector, the movement of a cursor of a pointing device in the information processing apparatus;

displaying an area for displaying an execution screen for the application and displaying an operation area for acquiring the motion vector different from the area for displaying the execution screen on a single display screen; and mapping the motion vector to the movement of the current position of an operation target in the application, wherein the server performs the acquisition of the program, wherein the information processing apparatus performs the displaying of the area and the acquisition of the motion vector, and wherein the providing of the application and the mapping of the motion vector are performed by at least one of the information processing apparatus and the server, wherein the method further comprises:

displaying a starting position that serves as the origin for calculating the motion vector in the operation area;

acquiring a vector starting at the starting position and ending at the position of the cursor of the pointing device;

obtaining a first vector starting at the starting position and ending at the position of the cursor of the pointing device;

sampling the position of the cursor of the pointing device at predetermined sampling intervals;

obtaining a second vector ending at the latest sampled position of the cursor and starting at the position of the cursor sampled at one previous interval;

calculating the moving velocity of the cursor based on a length of the second vector and the sampling interval; and selecting the first vector as the motion vector when the moving velocity is less than or equal to a predetermined vector selection reference velocity, and selecting the second vector as the motion vector when the moving velocity obtained by the moving velocity acquisition unit exceeds the vector selection reference velocity.

5. A server, in an application provision system, for providing an application to an information processing apparatus via a network in the application provision system comprising the server and the information processing apparatus, comprising:

a recording unit configured to store a program for realizing the application, wherein the application provision system comprises:
an application provision unit configured to provide the application;
a motion vector acquisition unit configured to acquire, as a motion vector, the movement of a cursor of a pointing device in the information processing apparatus;
a display unit configured to display an execution screen for the application on the information processing apparatus and to display an area for displaying the execution screen for the application and an to display an operation area for acquiring the motion vector different from the area for displaying the execution screen on a single display screen; and
a conversion unit configured to map the motion vector to the movement of the current position of an operation target in the application,
wherein the display unit displays a starting position that serves as the origin for calculating the motion vector in the operation area, and
wherein the motion vector acquisition unit acquires a vector starting at the starting position and ending at the position of the cursor of the pointing device,
wherein the motion vector acquisition unit includes:
a first vector acquisition unit for obtaining a vector starting at the starting position and ending at the position of the cursor of the pointing device;
a second vector acquisition unit for sampling the position of the cursor of the pointing device at predetermined sampling intervals and then obtaining a vector ending at the latest sampled position of the cursor and starting at the position of the cursor sampled at one previous interval;
a moving velocity acquisition unit for obtaining the moving velocity of the cursor based on the length of a motion vector obtained by the second vector acquisition unit and based on the sampling interval; and
a motion vector selection unit for selecting the vector obtained by the first vector acquisition unit as the motion vector when the moving velocity obtained by the moving velocity acquisition unit is less than or equal to a predetermined vector selection reference velocity, and for selecting the vector obtained by the second vector acquisition unit as the motion vector when the moving velocity obtained by the moving velocity acquisition unit exceeds the vector selection reference velocity.

6. An information processing method allowing a processor to map the movement of a cursor of a pointing device,
wherein the movement of the cursor is mapped to the movement of the current position of an operation target in an application,
wherein the movement of the cursor is in an operation area provided in an area different from an area for displaying an execution screen,
wherein the movement of the cursor is mapped on a single display screen for displaying the execution screen for the application, and
wherein the operation area and the execution screen are both included on the single display screen,
wherein the display screen displays a starting position that serves as the origin calculating a motion vector in the operation area,
wherein a motion vector acquisition unit acquires a vector starting at the starting position and ending at the position of the cursor of the pointing device,
wherein the motion vector acquisition unit includes:
a first vector acquisition unit for obtaining a vector starting at the starting position and ending at the position of the cursor of the pointing device;
a second vector acquisition unit for sampling the position of the cursor of the pointing device at predetermined sampling intervals and then obtaining a vector ending at the latest sampled position of the cursor and starting at the position of the cursor sampled at one previous interval;
a moving velocity acquisition unit for obtaining the moving velocity of the cursor based on the length of a motion vector obtained by the second vector acquisition unit and based on the sampling interval; and
a motion vector selection unit for selecting the vector obtained by the first vector acquisition unit as the motion vector when the moving velocity obtained by the moving velocity, and for selecting the vector obtained by the second vector acquisition unit as the motion vector when the moving velocity obtained by the moving velocity acquisition unit exceeds the vector selection reference velocity.

7. The information processing method according to claim 6,
wherein the application is developed being designed to be operated by a specialized controller different from the pointing device, and
wherein the motion vector of the cursor of the pointing device is mapped to the movement of the current position of the operation target in the application by converting the motion vector into an input signal from the controller.

8. A computer program embedded on a non-transitory computer-readable recording medium, comprising:
a module configured to display an operation area for an application by a pointing device in an area different from an area for displaying an execution screen on a single display screen for displaying the execution screen for the application; and
a module configured to map the movement of a cursor of the pointing device in the operation area to the movement of the current position of an operation target in the application
wherein the operation area and the execution screen are both included on the single display screen,
wherein the display screen displays a starting position that serves as the origin for calculating a motion vector in the operation area, and
wherein a motion vector acquisition unit acquires a vector starting at the starting position and ending at the position of the cursor of the pointing device,
wherein the motion vector acquisition unit includes:
a first vector acquisition unit for obtaining a vector starting at the star ing position and ending at the position of the cursor of the pointing device;
a second vector acquisition unit for sampling the position of the cursor of the pointing device at predetermined sampling intervals and then obtaining a vector ending at the latest sampled position of the cursor and starting at the position of the cursor sampled at one previous interval;
a moving velocity acquisition unit for obtaining the moving velocity of the cursor based on the length of a motion vector obtained by the second vector acquisition unit and based on the sampling interval; and
a motion vector selection unit for selecting the vector obtained by the first vector acquisition unit as the motion vector when the moving velocity obtained by the moving velocity acquisition unit is less than or equal to a predetermined vector selection reference velocity, and for selecting the vector obtained by the second vector acquisition unit as the motion vector when the moving velocity obtained by the moving velocity acquisition unit exceeds the vector selection reference velocity.

9. The information processing method according to claim 7,
wherein the operation area displays all operation buttons of the specialized controller.

10. The information processing method according to claim 9,
wherein the operation area only displays a subset of the operation buttons necessary for control of a game application.

* * * * *